United States Patent [19]
Mrotek et al.

[11] Patent Number: 5,308,719
[45] Date of Patent: May 3, 1994

[54] LEAD ACID BATTERIES CONTAINING CENTER LUG PLATES AND HIGH PERFORMANCE CAST-ON STRAPS

[75] Inventors: Edward N. Mrotek, Grafton; David A. Thuerk, Brookfield; Wen-Hong Kao, Brown Deer, all of Wis.

[73] Assignee: Globe-union Inc., Milwaukee, Wis.

[21] Appl. No.: 948,171

[22] Filed: Sep. 21, 1992

[51] Int. Cl.⁵ .............................. H01M 4/72
[52] U.S. Cl. ............................ 429/160; 429/211; 429/241
[58] Field of Search ............... 429/211, 160, 241

[56] References Cited

U.S. PATENT DOCUMENTS

| | | | |
|---|---|---|---|
| 487,834 | 12/1892 | Griscom | 429/241 X |
| 669,085 | 3/1901 | Heidel . | |
| 1,983,611 | 12/1934 | Jackson | 429/160 |
| 3,466,193 | 9/1969 | Hughel . | |
| 3,579,386 | 5/1971 | Tiegel et al. | 429/160 |
| 3,923,545 | 12/1975 | Margulies et al. . | |
| 4,118,553 | 10/1978 | Buckethal et al. | 429/234 |
| 4,221,852 | 9/1980 | Qureshi | 429/211 |
| 4,320,183 | 3/1982 | Qureshi | 429/211 |
| 4,477,546 | 10/1984 | Wheeler et al. | 429/241 X |
| 4,555,459 | 11/1985 | Anderson et al. | 429/211 |
| 4,683,180 | 7/1987 | Bish et al. | 429/130 |
| 5,098,799 | 3/1992 | Bowen et al. | 429/67 |

FOREIGN PATENT DOCUMENTS

| | | | |
|---|---|---|---|
| 7693 | 11/1898 | Norway | 429/160 |
| 2170343 | 7/1986 | United Kingdom | 429/160 |

Primary Examiner—Stephen Kalafut
Attorney, Agent, or Firm—Foley & Lardner

[57] ABSTRACT

An grid for a lead acid battery plate includes a central plate lug, the lug preferably having an expanded base for the collection of current and the grid being constructed in such a manner that the amount of metal is concentrated in the vicinity of the lug. A unique cast-on strap design for use with the grids is also disclosed. Substantial manufacturing advantages result from the use of such grids, and the performance of the battery can be increased to the point that individual battery plates may be eliminated, resulting in lighter weight batteries and material cost savings.

15 Claims, 3 Drawing Sheets

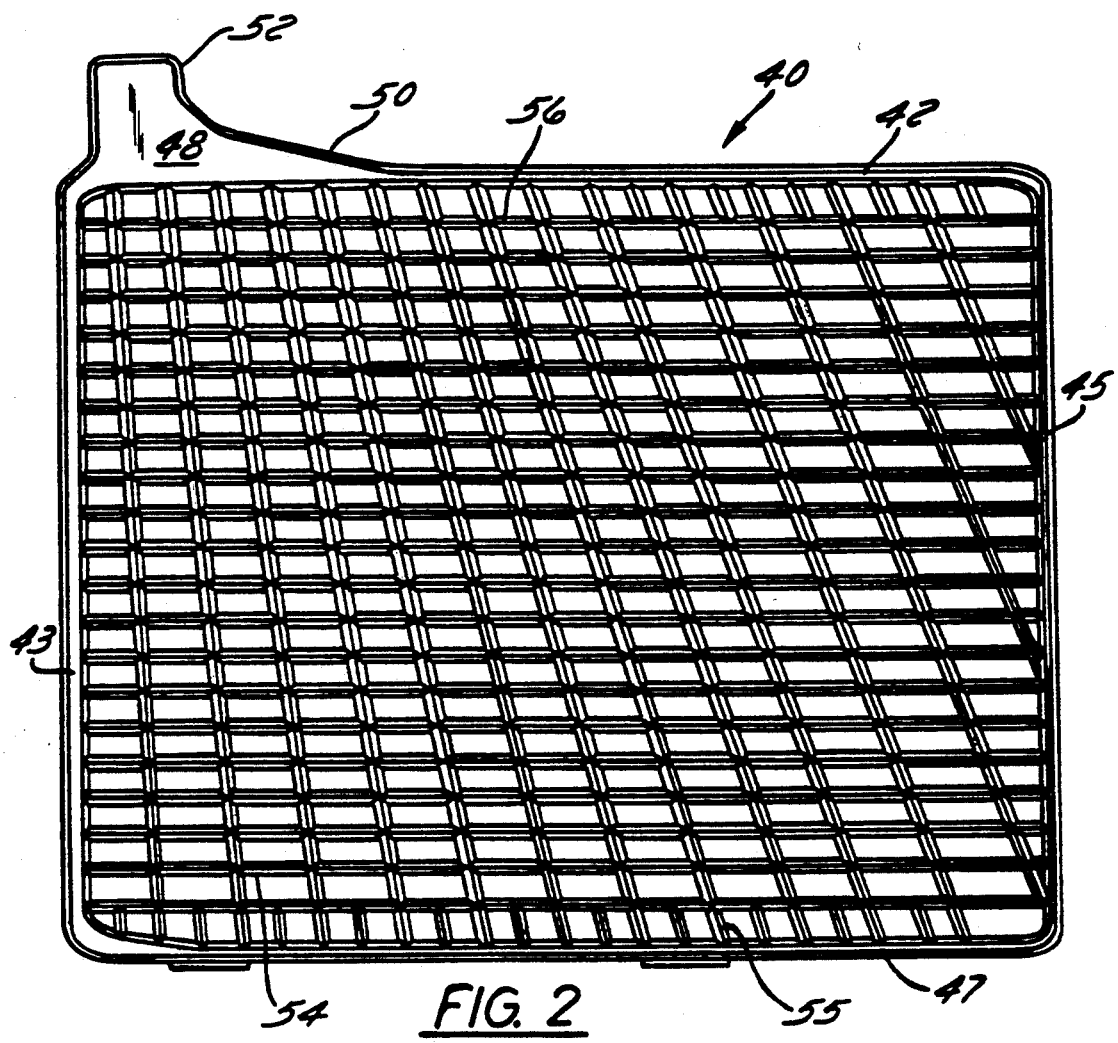
FIG. 2
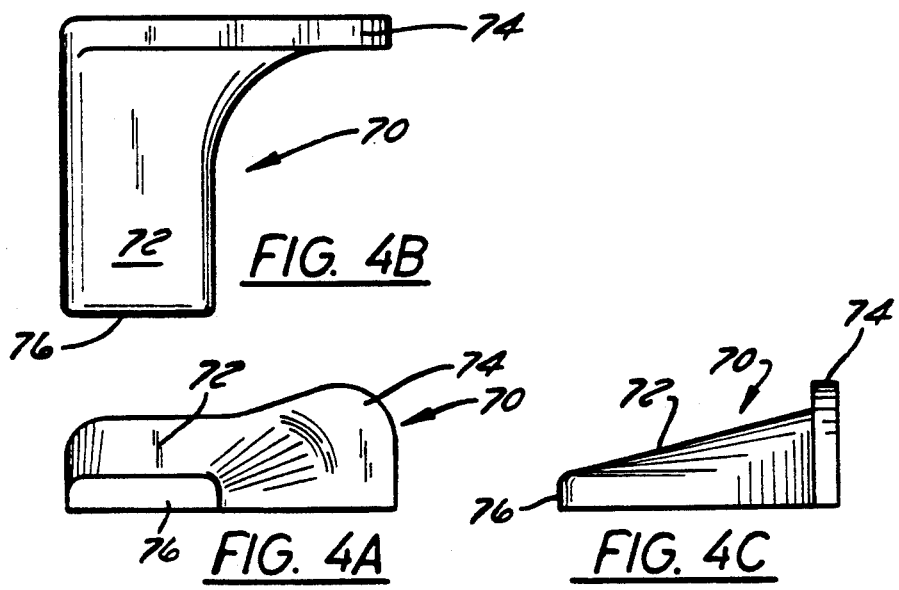
FIG. 4B
FIG. 4A　　FIG. 4C

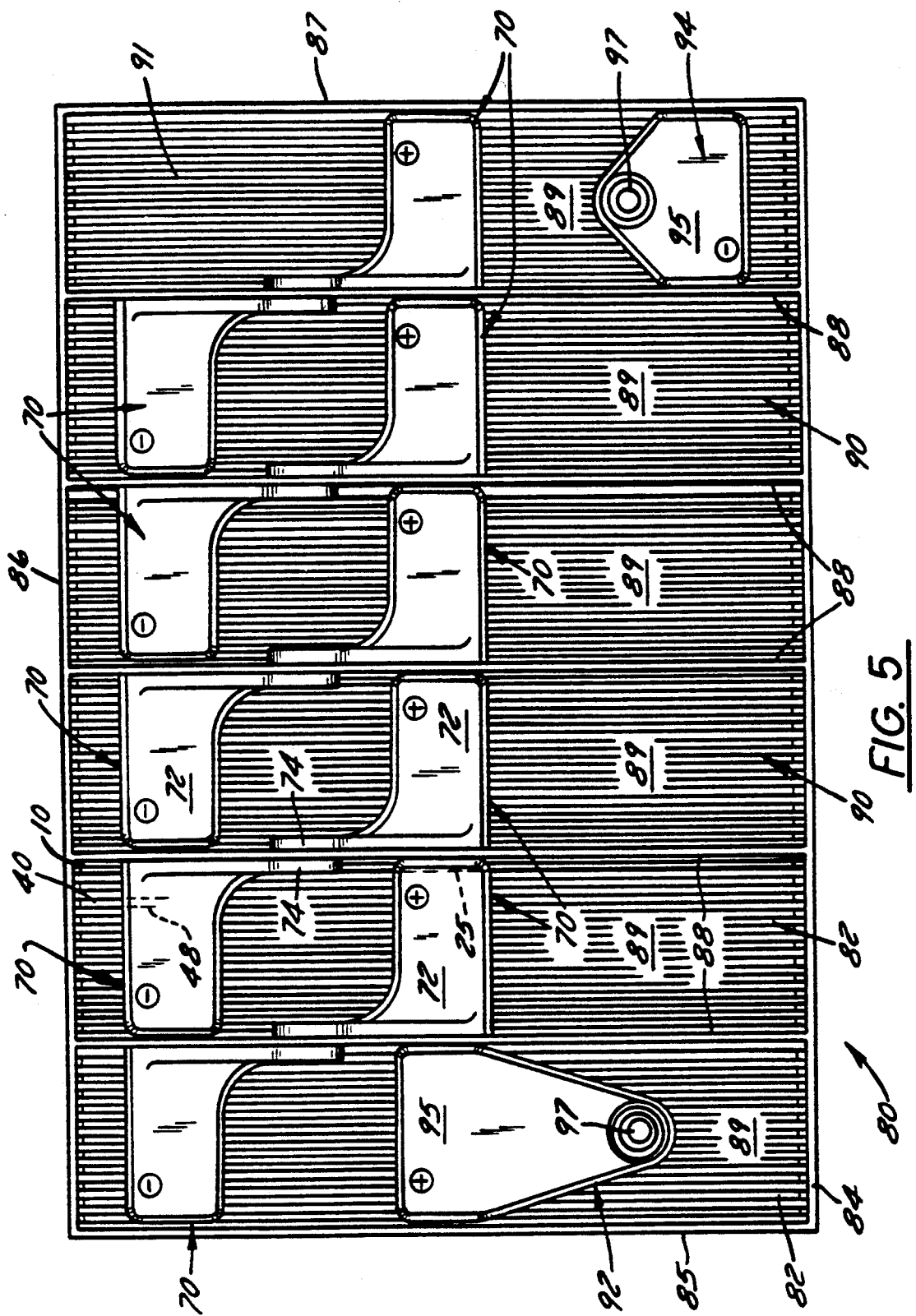

LEAD ACID BATTERIES CONTAINING CENTER LUG PLATES AND HIGH PERFORMANCE CAST-ON STRAPS

BACKGROUND OF THE INVENTION

1. Field of the Invention

The present invention relates generally to the field of lead acid batteries, and more particularly, to a unique battery grid construction having a center lug. Still more specifically, the present invention relates to positive or negative battery plates made from such center lug grids. The invention also relates to cast-on straps of a unique design which permits materials cost savings, improved conductivity and manufacturing efficiencies in the assembly of the battery elements. In a further refinement of the present invention, the invention relates to grid constructions which include grid lugs having expanded bases and which concentrate metal, typically lead alloys, in the area of the lug to facilitate current collection. In combination, the present invention permits the elimination of individual battery plates or altering the size of the plates, yielding lighter weight batteries having performance characteristics similar to the heavier batteries which they are designed to replace or batteries of similar weight having dramatically improved performance characteristics.

2. Description of Prior Battery Systems

Lead acid batteries typically comprise a series of thin, flat, generally rectangular grids for carrying a current through the battery. The grids also serve as a substrate for supporting electrochemically active materials or "paste" deposited thereon during manufacture to form battery plates. The paste typically comprises a mixture of lead oxide and a dilute acid solution, for example sulfuric acid. The paste composition is determined by power requirements, cost and the battery environment, as is known in the art.

It is also known that groupings of individual battery plates may be assembled, interleaved with separator material, and cast together to form plate stacks. The latter are then assembled in a container to form a final battery. A typical example would be an automobile battery of the 12-volt variety where, six individual stacks are placed into a plastic container having six compartments. Obviously, to permit current to flow throughout the battery, it is necessary to join the cast-on straps of one stack with the appropriate cast-on strap of the adjacent stack. Moreover, it is necessary to provide terminal electrodes which will extend through the casing to permit electrical contact with the vehicle's electrical system.

After the battery plates are fully assembled, they are formed, i.e. charged, and the battery is placed into service. An important characteristic of batteries is called "cold cranking power," i.e. the amount of power which can be generated per unit of time. Further references will be made to cold cranking power in later sections of this specification.

In more recent years, the grid has been formed in a screen-like pattern, having a matrix or a honeycomb pattern of alternating metal strips and open spaces. A porous chemical paste is applied to the grids and the lead frame members at the top, bottom and sides. After the paste is cured, the electrodes are assembled into a battery casing, whereupon the housing is filled with aqueous electrolyte solution and sealed. In current systems, the lugs have been symmetrically offset from the centerline of the battery by amounts ranging from ⅛ inch to much larger amounts, and in many designs, the lugs of either the positive or negative battery plates are located near an upper corner of the plate. During assembly, it is necessary to couple together the positive lugs of the battery plates and to couple together the lugs of the negative plates. This is typically accomplished using cast-on lead straps formed by taking assembled battery plate stacks, inverting them, and dipping the lugs into molten lead contained within a mold. In the most common batteries in use at the time of the filing of this specification, such cast-on straps have an upstanding end position, as will be explained more fully when the drawings are described later herein.

Several of these basic battery principles are illustrated in United States patents which will be discussed below. The first is U.S. Pat. No. 669,085, issued Mar. 5, 1901 to Heidel and entitled "Battery Electrode." This patent relates to a method of mounting battery grids in a container, where recessed bosses are provided around the edges of the battery and plugs are seated in the bosses to serve as insulating spacers between the electrode and the battery cell. In FIG. 1 of the patent, an element which is unnumbered appears to be relatively near but is offset from the centerline of the battery. The element appears to be pasted, which would make it entirely distinct from the types of collector systems used today.

Another battery storage plate is shown in U.S. Pat. No. 3,466,193, issued Sep. 9, 1969 to Hughel and entitled "Storage Battery Positive Plate With Lead Fibers." In this device, 5–25% of short lead fibers are used with the positive paste material. The collectors shown in this device extend from the edges of the grids.

In U.S. Pat. No. 3,923,545, issued Dec. 2, 1975 to Margulies, et al., a "Grid Structure For High Rate Lead/Acid Battery" is described. In this device, the grid is constructed of more numerous vertical elements than horizontal elements and a collector tab is provided offset from the center of the top. A tapered portion is provided on the top frame element. In addition, at least two current-carrying grid elements are tapered in width and expand from the bottom of the plate toward the top thereof, the purpose of which is stated to be to maximize mechanical support while minimizing the resistive paths in regions of highest current density. In the background section of this patent, reference is made to an earlier patent wherein the tops of several "bars" nearest the terminal are thickened to provide ample current-carrying capacity in the region of the terminal lug.

Another earlier grid design is shown in U.S. Pat. No. 4,118,553, issued Oct. 3, 1978 to Buckethal, et al. and entitled "Composite Battery Plate Grid And Method Of Manufacturing." This patent, owned by the assignee of the present invention, describes a composite grid including a plastic support having conductive members cast in a pattern extending generally radially from the collector lug, which in this patent is located near a corner of the grid. The grid includes a rectangular frame, and horizontal and vertical grid elements, as well as the radial elements previously mentioned. The patent relates primarily to methods for molding the grid, especially the plastic support thereof.

In U.S. Pat. No. 4,221,852, issued Sep. 9, 1980 to Qureshi for "Radial Grids For Lead Acid Batteries," the storage grid is described as including a frame having a lug on the upper edge near the corner, a set of wires parallel to one another connecting the side frame elements and a set of radial arms diverging away from the upper edge to connect the upper edge to each of the three other edges of the frame. From the patent drawings, it appears that the radial and horizontal arms are generally uniform in cross-section, although the pattern of open spaces varies as the radial arms tend to converge toward the top of the grid. Several embodiments of the radial wire design are shown.

A different grid arrangement for lead acid batteries is shown in U.S. Pat. No. 4,320,183, issued Mar. 16, 1982 to Qureshi and entitled "Grid For Batteries." The grid disclosed in this patent for supporting the active battery material is characterized by a "quasi-radial design" adapted to provide efficient battery operation. In addition to the horizontal grid elements and straight radial elements emanating from the upper frame, the design includes several elements which are partially radial and partially vertical in configuration. The obliquely arranged wires extend toward the bottom frame element.

Yet a different arrangement for grid elements is disclosed in Anderson, et al., U.S. Pat. No. 4,555,459, issued Nov. 26, 1985 and entitled "Battery Grids." The horizontal and angled wires defining this grid form a plurality of parallelogram spaces of substantially equal size, whereby paste pellets may be more uniform in the pasting operation. The lug is located on the top frame generally adjacent a corner, and in one embodiment, a tapered wire element is arranged vertically with the taper extending from bottom to top to divide the grid into two rectangular sections, each of which contains the parallelogram spaces.

A different battery plate configuration is shown in U.S. Pat. No. 4,683,180, issued Jul. 28, 1987 to Bish, et al. and entitled "Electric Storage Battery." The lugs for the respective positive and negative grids are each offset from the centerline of the battery and are coupled to like plates using a device which includes an insulating collar tightly engaging the root of each lug. The collars of the several plates abut one another and may serve to form a mold for shaping a plate strap cast thereon. The lug itself is depicted as being generally rectangular at its upper end and generally trapezoidal in the portion intermediate the upper portion and the grid itself.

Finally, another battery grid is disclosed in U.S. Pat. No. 5,098,799, issued Mar. 24, 1992 to Bowen, et al. and entitled "Battery Electrode Growth Accommodation." In this device, a battery grid includes a plastic frame and a plate suspended from the top of the frame to hang freely in the plastic frame. The suspension mechanism permits expansion of the paste in the planar direction of the grid. The grid itself is a relatively standard design, with a lug offset from the center of the upper frame member, with horizontal wires and a plurality of radially extending wires.

While it is apparent from the foregoing description that numerous plate and grid designs have been developed in the lead acid battery art, several problems still remain in the design and manufacture of such batteries. One of the most significant problems is the weight associated with this type of energy source, especially in these times of increasing concern for fuel efficiency and maintaining components at their lowest possible weight. Most commercial battery plates include lead alloy grid materials, combined with the electrolyte and lead based paste materials. Any system which reduced the battery weight, while maintaining the power required for a particular application, would be a significant advance in the art.

Further problems relate to the manufacture of such batteries, where the plates must be coupled by cast-on straps and where the straps must be welded to one another in adjacent cells to permit current flow through the system. Ways in which such manufacturing problems could be overcome would also represent a significant advance in the art.

Furthermore, it is always advantageous to look for ways to maximize the efficiency of the grid in transferring current from the sites where the electrochemical reactions are occurring to the collector lugs. Improvement in grid design in this area is also important.

Any system which combines the various advantages discussed in the previous few paragraphs would represent a very substantial advance in this art.

SUMMARY OF THE INVENTION

The present invention features a novel battery grid design which incorporates, for either the positive or negative plates, a center lug structure to maximize current collection. The present invention also features a unique arrangement of the top grid frame element and lug to provide a larger amount of conductive material in the area of the lug, and an arrangement of the vertical or radially extending wires which also provides more grid alloy material in the vicinity of the lug.

In addition to the novel grid design and construction techniques, the present invention also features a different cast-on strap arrangement which could be used for traditional batteries but which is especially suited for coupling grids having a center lug. The strap design is more conductive than straps of present design.

The present invention also features a grid design wherein the center lug grid is up to 68% more conductive than grids of current design, while being only very slightly heavier in terms of the amount of conductive grid material. With such higher conductivity, the cold cranking voltage for the battery can be improved to such an extent that it is possible to eliminate one plate from each plate stack or reduce the height of the existing plates, thereby saving material costs. Utilizing the combined cast-on strap and center lug grid design can result in an overall reduction in battery weight with only a minimal reduction in reserve capacity. If plates are eliminated, taller plates can be used with the new cast-on straps and any active materials removed can be redistributed on the remaining plates. Higher manufacturing speed can be achieved, leading to less capital and storage cost due to a lower plate count.

Another important feature of the present invention is the ability to eliminate the possibility of element reversal during assembly. When a center lug grid is used for the positive or negative plates, another lug location must be chosen for the other plates. Since the elements can be aligned in only one direction because of the asymmetrical strap layout, failures attributed to element reversal can be eliminated. Furthermore, in-line welding simplifies the weld jaw alignment which must be used to couple the straps of adjoining cells electrically to one another.

The preferred grid pattern includes more conductive material on the top and near the lug area resulting from the use of wider vertical wires and vertical wires which taper.

Other features of the invention and other ways in which the present invention provides the features will become apparent to one skilled in the art after reading the following detailed description of a particularly preferred embodiment.

DETAILED DESCRIPTION OF THE DRAWINGS

FIG. 2 is a front perspective view of a negative battery grid prepared according to the most preferred form of the present invention;

FIG. 4A is a front elevation view of a cast-on strap design according to the most preferred form of the present invention;

FIG. 4B is a top elevation view of the cast-on strap shown in FIG. 4A;

FIG. 4C is a side elevation view of the cast-on strap shown in FIG. 4A; and

FIG. 5 is a top perspective and schematic view of a six compartment battery showing the cast-on strap arrangement according to the preferred form of the present invention and showing positive and negative terminal electrodes.

In the various figures, like reference numerals are used to identify like components.

DETAILED DESCRIPTION OF THE MOST PREFERRED EMBODIMENT

Figure 1:
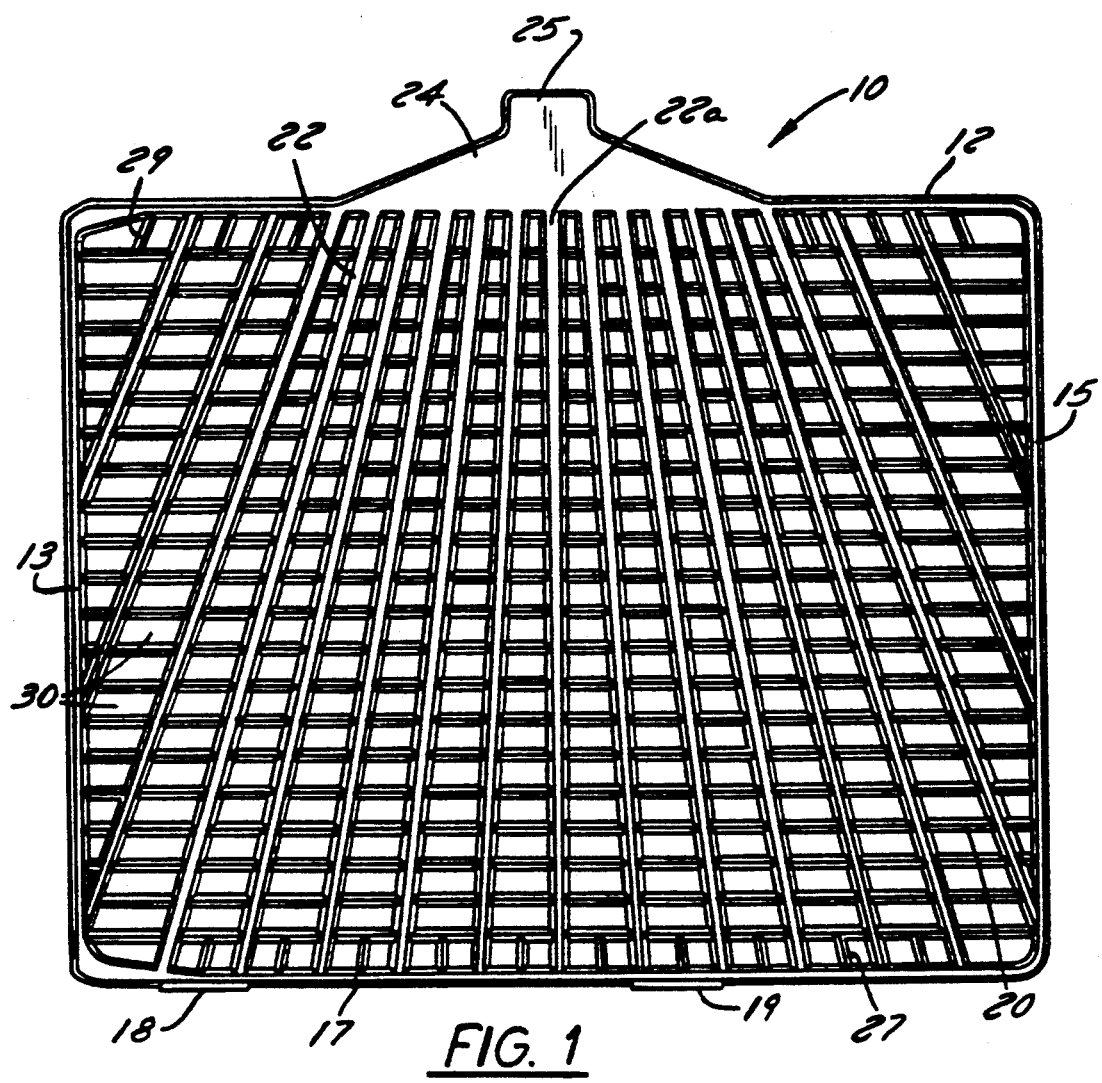
FIG. 1 is a front elevation view of a center lug positive battery grid prepared according to the most preferred form of the present invention.

Before proceeding to the detailed description of the preferred embodiment of the present invention, several comments would be appropriate with regard to the applicability and scope thereof.

First, several terms will be used throughout the remainder of the specification which should be defined in this introduction. The term "grid" will be used to refer to the open spaced network of wires and surrounding frame elements and a lug, all used to conduct current from electrochemical reactions which take place during formation and discharge of the battery. The term "plate" as used herein will refer to the positive or negative combinations of active paste material and grids. The term "stack" will refer to a combination of a plurality of positive and negative plates which are assembled for insertion into a battery compartment, such as a cell of a multi-stack battery. The term "cast-on strap" as used herein means the strap of conductive material used to combine and electrically interconnect the lugs of like polarity within a stack. "Terminal electrodes" are the positive and negative electrodes which are typically found in the end compartments of a battery. Such terminal electrodes typically include portiones which may extend either through the top of the battery or the front of the battery, depending on battery design.

With regard to materials, they do not, in and of themselves, form part of the present invention. In that regard, materials previously used and well known in the art for preparing battery grids may be used in the present invention, including the preferred lead-antimony alloys. With regard to the active paste materials, these also can be typical paste materials which are described in numerous patents and texts on lead acid batteries. The cast-on straps are typically lead and, in connection with the present invention, it should be mentioned that they are typically added to the battery stacks in a single operation which involves the assembly of a plurality of stacks into the number needed for the final battery, the grasping of them by equipment which will allow the inversion of the plurality of stacks and insertion of the lugs into molds containing liquid lead. Following cooling, the stack is removed, at which time the various straps are solid and attached to the lugs.

In connection with the casing material, it also can be selected from materials well known in the art, typically having an outer container as will be shown in one of the figures, a plurality of cell dividers, and a cover (not shown herein) which can include several other normal components for lead acid batteries, including vent caps, explosion attenuation devices, and the like. While reference will be made to certain materials in connection with some comparative data provided in this specification, the invention relates primarily to arrangement of parts and novel designs for grids and straps, rather than materials.

Before leaving this section of the specification, it should also be mentioned that the size of the various components can be varied widely utilizing the principles of the present invention. The illustrations and some dimensions provided herein relate to automotive applications, wherein groups of 12-13 plates are used in each of six stacks for producing a standard automotive 12-volt battery. It will become obvious to those skilled in the art after reading this specification that the size of the individual grids, the number of plates in any particular stack, and the number of stacks used to construct a battery may vary widely depending upon the desired end use.

Proceeding next to a description of the components comprising the most preferred form of the present invention and concluding with a discussion of how such components are assembled in a lightweight battery package having power and reserve capacities comparable to heavier batteries now in use, attention should first be directed to FIG. 1. In such figure, a battery grid 10 is shown. Grid 10, in the ensuing discussion, will be treated as a grid for a positive battery plate, although it should be understood at the outset that the grids described in FIGS. 1 and 2 could be reversed, i.e. grid 10 could be used for the negative electrode plate.

Like other grids discussed in some of the patents mentioned above, grid 10 includes a generally rectangular frame having a top frame element 12, first and second side frame elements 13 and 15, and a bottom frame element 17. The illustration also shows two small feet 18 and 19 extending downwardly from bottom frame member 17, such members also being known in the battery art and being provided to space the grid, and the plate into which it will be made, from the bottom of the battery container. Grid 10 also includes a plurality of horizontal wires represented by reference numeral 20 and being generally equally spaced between bottom frame member 17 and top frame member 12. Twenty of wires 20 are shown in the illustrated figure, although that number could be varied.

Grid 10 also includes a plurality of vertical and radially directed wires 22 extending from top frame element 12 downwardly toward frame element 17, and in the case of certain of wires 22, connecting top frame member 12 and the nearest side frame members 13 and 15. In the preferred embodiment, the wires 22 extend at an angle of between 0° and 26° from vertical, a center one of the wires 22 (identified as 22a) being located halfway between side frame elements 13 and 15 and extending perpendicularly to the top and bottom frame elements of grid 10. As the distance diminishes between wire 22a and the side walls, the angle gradually increases.

It will also be noted by reference to FIG. 1 that wires 22 taper outwardly from bottom frame element 17 as they approach top frame element 12. Another feature of the grid of the present invention is illustrated in FIG. 1, where the top frame element 12 includes, at its middle, a generally triangularly-shaped and upwardly extending portion 24, terminating at its upper end in a rectangularly-shaped upper lug portion 25. While in the illustrated embodiment the line between top frame element 12 and portion 25 is shown as a straight line, it could be curved or stepped. Portion 25 is located immediately above wire 22a and at the centerline of the grid 10 between side frame elements 13 and 15.

A number of short connector wires 27 and 29 are shown coupling portions of bottom frame element 17 and the first horizontal wire 20 and top frame element 12 and its nearest horizontal wire 20, the latter being provided for structural integrity and, in and of themselves, not forming part of the present invention.

The arrangement of the various wires 20, 22, 22a, 27 and 29, as well as the frame elements, define a plurality of open spaces 30 which function to receive and retain battery paste.

Several dimensions will be provided for the grids shown in FIG. 1, it again being important to understand that the dimensions are for a particular application and are not limiting. These grids are adapted to be contained in batteries made by the assignee of the present invention and represent only a single size battery. The assignee manufactures many, many varieties and sizes of lead acid batteries employing grids with which the principles of the present invention could be readily adapted.

By way of example, however, the grid 10 could have a width of approximately 5.8 inches and an overall height of about 4.48 inches (not including the extensions from the top frame member). Portion 25 in the illustrated embodiment has a height of approximately 0.2 inches, while the height of the portion 24 is approximately 0.40 inches. The lug width, i.e. the width of area 25, is 0.50 inches.

Grid 10, which has now been described, is of the radial or branched radial design, as opposed to the rectilinear design shown in some of the prior art patents discussed above. The primary features of grid 10 include providing more conductive material at the top and lug areas and less on the lower portion of the grid. The vertical wires are wider than the horizontal wires and taper. In general, grid 10 is designed to minimize the amount of lead in the horizontal wires and to maximize the amount of lead which may be, within weight constraints of the overall battery design, concentrated in the area of the lug. Another way in which this is accomplished in the most preferred form of the invention is to reduce the width of the bottom frame element 17 to 0.080 inches (as compared to present designs which are 0.100 inches) and to increase the width of the top frame element 12 to 0.110 inches.

FIG. 2 shows a negative grid 40 prepared according to the teachings of the present invention and useful with grid 10 to prepare electrode plates, electrode stacks, and eventually a battery. Grid 40 includes an upper frame element 42, opposed side frame elements 43 and 45, and a bottom frame element 47 generally having dimensions similar to those of grid 10. The most prominent feature of grid 40 is its lug 48 which is located, in this illustration, in the upper left-hand corner but which also includes a generally broadened lower portion 50 and an upper, generally rectangular-shaped portion 52. Horizontal wires 54 are provided, as are a plurality of strengthening shorter wires 55 coupling the top frame element 42 and the bottom frame element 47 to the nearest ones of the horizontal wires 54. A plurality of radially extending wires 56, emanating generally from the top frame element 42, extend toward the bottom frame element 47 and side frame element 45 and include the taper referred to previously in connection with grid 10. Like grid 10, grid 40 incorporates a higher percentage of the conductive material in the area of the lug. Grid 40 also includes a thinner bottom frame element 47 and a thicker upper frame element 42, all being features which will increase the conductivity (decrease the resistivity) of the grid, thereby facilitating current flow to the lug.

The dimensions of grids 10 and 40 are substantially identical, except for the location of the lug, so that the positive and negative grids can be covered with active paste materials and combined to form a plate stack, an example of which will be more fully illustrated hereafter. For comparable dimensions, grid 40 may also be slightly heavier than the grid it was designed to replace, a characteristic which will be more than offset by the ability to eliminate at least one grid from each plate stack, resulting in a lower overall weight for the stack. Instead of plate elimination, shorter plates could be employed to achieve the weight reduction. Such weight reduction is achieved without loss of cold cranking power or significant loss of reserve capacity. Alternatively, better performance could be achieved by batteries having similar weight.

Both grids 10 and 40 represent a significant departure from grids commonly used in today's automotive batteries. By way of example, the grids used by the assignee of the present invention typically have positive and negative grids which resemble each other in configuration, with the center point of the lug being offset from the centerline of the grid by 0.688 inches. While this does allow for certain symmetries in the assembly of the battery, it also results in significant manufacturing disadvantages and in the potential for element reversal. The latter can be totally eliminated using the grids of the present invention.

Figure 3A:
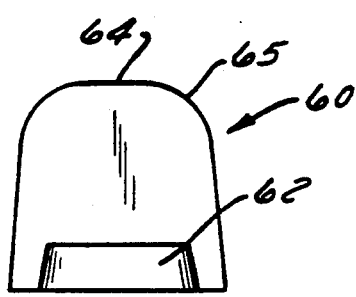
FIG. 3A is a front elevation view of a prior art cast-on strap design.

Proceeding now to a description of FIG. 3A, a cast-on strap 60 of the prior art is shown. As previously mentioned, such straps are added to battery plate stacks by first assembling a desired number of positive and negative plates. Such assembly involves alternating the positive and negative plates and the placement of a separator material between the plates. Several machines are known in the art for assembling the plates and for grasping them so that they may be inverted to place the lugs into a strap mold containing molten lead. After removal of the plates from the mold, a strap, such as shown in FIG. 3A is attached to each lug in a row of lugs in the plate stack.

Figure 3B:
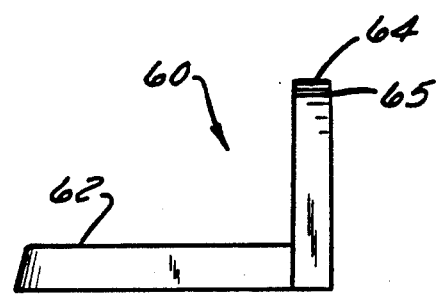
FIG. 3B is a side elevation view of the strap shown in FIG. 3A.

FIGS. 3A and 3B show different views of a typical cast-on strap. Rather than show the mold from which they are made, front and side views are shown, and it should be evident from the description to this point that the actual straps would be coupled to collector lugs since they are formed integrally therewith. Cast-on straps 60 generally include a rectangular, elongate body portion 62 which will have a length sufficient to be electrically coupled to each lug in a row of a battery plate stack. Cast-on straps 60 also include a vertically extending portion 64 at one end of portion 60, end 64 having a rounded top 65 so that the overall appearance of the end portion 64 is similar to a tombstone.

Straps 60 will be reversed in orientation for the positive and negative lugs so that the vertical portions 64 will be at opposite ends of the stack. It will also be recognized by those familiar with this art that portions 64 will be arranged to fit snugly against the dividing walls of the battery casing (not shown) so that portion 64 of one stack connecting positive plate lugs can be electrically fused through the casing wall to portion 64 of the strap coupling the negative plate lugs in the adjoining cell. Such coupling is accomplished in present battery making technology using weld jaws which extend downwardly over the pair of portions 64 and which are clamped together to perform the welding operation. Considerable care must be exercised during such welding operation because if the jaws are lowered too far, they will contact portions 62 of the straps 60 and may result in a misaligned and/or defective weld.

Proceeding next to the description of FIGS. 4A-4C, cast-on straps of the present invention are illustrated. These straps have a different configuration and orientation which is made possible by the center lug construction of the grids and plates with which they will be used. Straps 70 also are shown without the connected lugs and, as mentioned before, straps 70 would also be formed using molding techniques which themselves do not form part of the present invention. Straps 70 include an elongate body portion 72 having a length equal to or greater than the length of the row of lugs which it is designed to interconnect and a cross section which gradually increases in thickness and width between end 76 and lateral projection 74. At one end of portion 72 a laterally projecting extension 74 is formed. By comparing FIGS. 3A-3B and FIGS. 4A-4C, it will be noted that the overall height of the cast-on straps of the present invention are lower and that the tombstone appearance has been radically modified. The use of lower profile straps permits taller plates to be used, adding to the flexibility of battery design attainable with the present invention.

In practice, two cast-on straps 70 would be used for each battery stack (except the end stacks), one with plates including a center lug, and one with plates having a lug offset from the center. The straps 70 are arranged in such a manner that the lateral projections 74 extend into the area defined generally by the two lug rows of such a stack.

The end stacks would contain only a single one of the straps 70 and a further strap for the terminal electrodes, as will now be described in connection with FIG. 5.

FIG. 5 shows, in top elevation and somewhat schematic form, a battery prepared according to the teaching of the most preferred embodiment of the present invention. Individual plates are not shown in detail and the cover and its associated components have also been removed from the drawing to facilitate explanation of the components which form the most preferred aspects of the invention. The battery 80 includes a compartment 82 having a front wall 84, end walls 85 and 87, rear wall 86 and a bottom (not shown). Located between end walls 85 and 87 are five cell partitions 88, resulting in the formation of six compartments 89, as would typically be present in a 12 volt automotive battery.

A plate stack 90 is located in each compartment 89, each stack 90 being comprised of a plurality of positive and negative plates, with separator material placed therebetween and in the illustration, the positive plate lugs are arranged at the center line of the battery. The negative plate lugs are located near the rear wall 86, except for stack 91, in an end compartment where the negative plate lugs are located adjacent front wall 84. This reversal is provided merely to permit the terminal electrode to be described below to be located on the same side of the battery.

This figure clearly shows how the cast-on straps 70 are located within the battery compartment and how they alternate in mirror-image form so that the lateral extensions 74 of straps 70 form a single line down the battery in the area between body portions 72 of strap 70. It can also be appreciated, by reference to this figure, that the welding operation can more easily be accomplished using cast-on straps 70 in that jaw alignment is easier to achieve and there is less possibility for damage to straps or plates because portions 74 are spaced above the top of the plates.

FIG. 5 also illustrates the cast-on straps 92 and 94 provided respectively for the positive and negative terminal electrodes. These straps each include a body portion 95 coupling the respective lugs in the end compartments and a post 97 formed therewith to protrude, in this illustrative embodiment, through the cover (not shown). In many instances, the orientation of the terminal electrode will be dictated by the design parameters for the battery itself, and top post, side posts and other post designs are all known and would be readily adapted by one skilled in the art after reading the present specification. Straps 92 and 94 are not fused to straps in the adjacent cells.

A variety of terminal arrangements are possible using the grid and strap arrangement of the present invention, including top, side or corner configurations known to the art. These possibilities arise because of the non-symmetrical lug arrangement, including the center-line arrangement of one set of lugs.

While the present invention has been described in connection with certain preferred embodiments, it is not to be limited thereby but is to be limited solely by the claims which follow.

What is claimed is:

1. A grid for a lead acid battery, comprising:
  a generally rectangular, electrically conductive grid body having opposed top and bottom frame elements and opposed side frame elements, the grid also including a current collector lug extending from the top frame element and being centered between the side elements and wherein a plurality of spaced apart conductive wires define a grid pattern at least a portion or the wires extending in a non-parallel pattern from the top element.

2. The grid of claim 1, wherein the top frame element contains more electrically conductive material than the bottom frame element.

3. The grid of claim 1, wherein at least some of the wires extending from the top element are tapered and diminish in cross-sectional area as the distance from the top element increases.

4. The grid of claim 1, wherein the top element is increased in size at the middle thereof and the current collector lug extends from the increased size portion of the top element.

5. A stack of battery plates, comprising:

a first plurality of plates made from the grid of claim 1 having an active battery paste applied thereto alternating with a second plurality of plates made from a grid having its collector lug offset from the center of the grid and having active battery parts applied thereto, and separators located between the plates.

6. The plate stack of claim 5, wherein the first plurality of plates are pasted with positive active paste material and the second plurality of plates are pasted with negative active paste material.

7. The plate stack of claim 5, wherein the first plurality of plates are pasted with negative active paste material and the second plurality of plates are pasted with positive active paste material.

8. The plate stack of claim 5, wherein a first cast-on strap electrically couples the row of lugs of the first plurality of plates and a second cast-on strap electrically couples the lugs of the second plurality of plates, each cast-on strap being made from electrically conductive material and each cast-on strap having an elongate portion coupling the lugs and a portion laterally projecting from one end of the elongate portion.

9. The plate stack of claim 8, wherein the laterally projecting portions of the first and second cast-on straps are at opposite ends of the plate stack and are located in the area generally defined by the lug rows.

10. The plate stack of claim 8, wherein the cast-on straps are made of lead and are applied simultaneously by immersing the lugs of the plate stack in a mold containing molten lead.

11. The plate stack of claim 8, wherein one of the cast-on straps is replaced by a cast-on terminal electrode having a portion coupling the lugs of the lug row and having a terminal post.

12. A lead-acid battery comprising a plurality of cellular compartments formed by end walls and partitions, each of said compartments housing a plurality of positive and negative battery plates with separators disposed therebetween, each battery plate having a current collector lug, the lugs of the positive and negative plates being arranged respectively in spaced apart lines in each compartment, one of the lines extending along the center line of the battery.

13. The battery of claim 12, wherein the lugs in each line are electrically coupled to one another by cast on straps, a line in each of the end cellular compartments being electrically joined by a terminal cast on strap and the other lines being electrically joined by non-terminal cast on straps having an elongate portion with a first and second end, another portion extending laterally from the second end.

14. The battery of claim 13, wherein the non-terminal cast on straps increase in cross-sectional area between the first and second ends, being the greatest at the second ends.

15. The battery of claim 13, wherein the laterally extending portions of the non-terminal cast on straps are arranged on opposite sides of the partitions dividing the cellular compartments and are welded therethrough.

* * * * *